United States Patent [19]

Hegedus et al.

[11] Patent Number: 4,555,858
[45] Date of Patent: Dec. 3, 1985

[54] METHOD AND DEVICE FOR LOW ENERGY CONSUMPTION OR GRANULAR PRODUCTS OR THE LIKE CONTAINING MOISTURE FIXED OR DEPOSITED AT THE SURFACE WITH A CONSTANT YIELD

[75] Inventors: Béla Hegedus; Sándor Bálint, both of Orosháza; János Hudák, Nagyszénás; György Barta; József Aszlányi, both of Budapest, all of Hungary

[73] Assignee: "Oktober 6" Mezogazdasagi Termeloszovetkezet, Hungary

[21] Appl. No.: 513,116

[22] PCT Filed: Oct. 18, 1982

[86] PCT No.: PCT/HU82/00053
§ 371 Date: Jun. 14, 1983
§ 102(e) Date: Jun. 14, 1983

[87] PCT Pub. No.: WO83/01502
PCT Pub. Date: Apr. 28, 1983

[30] Foreign Application Priority Data
Oct. 21, 1981 [HU] Hungary .............................. 3071/81

[51] Int. Cl.⁴ .............................................. F26B 21/10
[52] U.S. Cl. .......................................... 34/25; 34/31; 34/48; 34/52
[58] Field of Search ................. 34/168, 169, 174, 65, 34/56, 48, 52, 25, 33, 13, 31

[56] References Cited

U.S. PATENT DOCUMENTS

| | | | |
|---|---|---|---|
| 1,127,974 | 2/1915 | Ellis | 34/65 |
| 3,129,073 | 4/1964 | Mathews | 34/56 |
| 3,406,463 | 10/1968 | Andersen | 34/56 |
| 4,004,351 | 1/1977 | Sanneman et al. | 34/56 |

FOREIGN PATENT DOCUMENTS

| | | |
|---|---|---|
| 2645835 | 4/1978 | Fed. Rep. of Germany . |
| 2300981 | 9/1976 | France . |
| 1437578 | 5/1976 | United Kingdom . |

OTHER PUBLICATIONS

Awtomatizatsia proizwodstwennykh protsessow etc. by V. A. Golubiatnikow, p. 163, Publ. Khimia (Moscow), 1972.

Primary Examiner—Larry I. Schwartz
Attorney, Agent, or Firm—Handal & Morofsky

[57] ABSTRACT

A hot drying agent discharged from the section for material transport of the bound moisture, having a low moisture content, is recirculated to the front part of the drying area; the moisture content of both of the fed and discharged material is measured and by means of the differential-analogue signal thus obtained the stream of the material to be dried and in a given case the heating of the drying agent is controlled. An apparatus for performing the drying operation is also provided.

11 Claims, 2 Drawing Figures

METHOD AND DEVICE FOR LOW ENERGY CONSUMPTION OR GRANULAR PRODUCTS OR THE LIKE CONTAINING MOISTURE FIXED OR DEPOSITED AT THE SURFACE WITH A CONSTANT YIELD

FIELD OF APPLICATION OF THE INVENTION

The invention relates to a process for drying agricultural and other granular products or produces with surface or bound moisture content, with a constant output and an energy saving method, in course of which the material to be dried is brought into contact with a heat carrying drying agent, while advancing through the drying area; thereafter the heat content of the drying agent laden with vapour is either partly utilized or led directly into the atmosphere, while the dry material, having been freed of its moisture content to the predetermined extent, is led to further processing or use.

Furtheron the invention relates to an equipment being suitable to perform the aforesaid process, having a drying area provided with a feed and discharge opening for the material to be dried, with a duct through which the pressure fan delivering the drying agent is connected and in a given case with an exhaustor for the suction of the drying agent, being connected via an exhaust duct, while before or behind the pressure fan a heating equipment for heating the drying agent is inserted.

STATE OF THE ART

It is a well known fact that dryers expel the liquids from materials containing the moisture on the surface or in bound form by evaporation. The thermal energy required for evaporation is led to the material to be dried either by radiation, conduction or convection accordingly, directly or by the intervention of some heat carrying agent, being generally a gaseous substance. The vapour having been evaporated is delivered by the heat carrying agent itself into the atmosphere. The dried material being freed of its moisture content to the predetermined extent is led on an other way to use or further processing.

In course of the drying process it is of utmost importance that as well the control of the drying process as the design of the dryer should facilitate that the energy required for evaporation should reach the material to be dried with a high efficiency and uniformly; further that during of the process losses should be minimized. Losses result in the first place from the heat escaping through the surface of the equipment, secondly from the heat leaving with the dried material, thirdly with the moisture converted into vapour and with the heat content of the vapour carrying drying agent.

Although with the processes and equipments having been realized in practice, the mentioned requirements were mostly met, but due to the previously prevailing relative energy abundance and the low price of energy carriers, less attention was paid to the economy of the drying process. Due to this fact, direct intervention to the drying process, as e.g. continuous control of the output, coordination of heating energy consumption and output, utilization of the heat content of the exiting agents were mostly neglected. As a consequence, it often occurs that the quality of the dryed product is not uniform, furtheron much more energy is used as theoretically needed.

SUMMARY OF THE INVENTION

The task of the invention consists of elimination of these disadvantageous features, simultaneously to ensure the uniform quality of the dried product.

The invention is based on a physical phenomenon, that far the intensity of the expulsion of moisture from certain materials to be dried by evaporation is considerably changing during the drying process. On the first interval, the moist material is only preheated, as in equipment operating mostly with atmospherical pressure, heating up to at about 60°–120° C. is needed to start rapid evaporation of the water. When the liquid contained and the material have reached the temperature of intensive evaporation, discharge of the moisture bound to the material surface or in the vicinity thereof begins. Here, if the structural design of the dryer enables an intensive heat supply, a considerable quantity of moisture can be expelled in a relatively short time, and in a nearly steady manner. To expel the moisture from the inside of the material, i.e. separation of the so-called bound moisture represents a considerably slower process. Heat energy transport begins through the material surface inwards, and at the same time moisture transport in the opposite direction, i.e. outwards takes place. The effect may be observed by the fact that the speed of moisture expulsion decreases, the temperature of the material increases, while the heat carrying gas is leaving the system with a decreased moisture content, however, at an increasing temperature. The conditions, e.g. for drying corns of maize, are illustrated in FIG. 1.

During the total drying period of about 4.5 hours, about ⅓ hour is required for heating up, the phase of intensive drying with approximately constant speed lasts about 1 hour, while the remaining time /4.5−1.3=3.2 hours/ represents the period needed for the previously described transport of heat and counter directed material transport.

Based on aforesaid, the task set was solved by the invention in such a way that the hot drying agent with a low degree of humidity discharged from the drying section where material transport of the bound moisture is taking place, is recirculated to the beginning of preheating and intensive drying. Simultaneously all other heating of these sections is stopped. Hereby the considerable heatloss occuring at the discharge from the section where material transport, i.e. removal of the bound moisture is taking place, will be regained without the use of a separate heat regenerating equipment. As a consequence, the only loss will appear at the remaining heat content of the drying agent, leaving the preheating and intensive drying sections, respectively.

As the drying agent is almost saturated when leaving the equipment, the losses are very low.

The basic idea of the invention involves also the recognition that reclaim of a considerable part of the perceptible heat leaving with the dried material without having been utilized, can reasonably be combined with the solution previously mentioned, in particular with air-dryers. When e.g. atmospherical air is allowed to stream, expediently via a ventilator, through the stream of the discharging dry material, temperature of the dry material will approach that of the ambient air to an extent having been defined by the conditions of heat-transfer, while the part of the heat content determined by cooling is transferred to the air current. The air current, being warmer than the environment, absolute moisture content of which equals to that of the ambient air, can be well utilized in the drying process in such a way that it is simply admixed to the hot air current entering into the section where material transport of the bound moisture is taking place, or it is led as combustion air into the firing area of the dryer.

By using the process according to the invention, both disadvantageous conditions having been mentioned in the preamble, namely the heat losses arising from discharging the dried material and from emitting the drying agent, may be considerably reduced. In accordance with the invention these quantities of heat can be utilized to a high extent to cover the thermal need in the preheating section and in the section for intensive drying, respectively. Accordingly, the only heat loss will appear in the quantity leaving therefrom. The appropriate numerical values will be detailed later in connection with an example relating to the process.

It is a well known fact that e.g. when drying vegetable products, the moisture content of the material to be dried varies within rather wide limits, resulting with all types of dryers in a variable moisture content of the final product, consequently, either the quantity of the drying agent, or the temperature of the drying process is to be changed, i.e. the intensity of the heat source has to be modified.

Uniformity of the quality of the dried product is ensured according to the invention in such a way that moisture content of the moist material to be fed into the drying area and that of the dry material discharged therefrom are determined by measurement, and by means of a differential-analogue signal thus obtained, the flow of the material to be dried, in some cases the heating of the drying agent is controlled.

With the knowledge of the parameter of the produce contained in the dryer, the quantity of the water to be expelled can be determined. With the system according to the invention, the flow of material should primarily be modulated in order to obtain a time wise constant expulsion of the moisture. In case of gravimetric material flow, said process involves the considerable advantage, in so far as quantitative control of the energy carrier /oil, gas, steam/ becomes practically superfluous, accordingly, heating equipment may be of a quite simple design. So, e.g. with the existing numerous tower-dryers, when using the process according to the invention, there is no need to exchange the firing equipment, no essential reconstruction is required. By controlling a common slide valve, having been inserted into the path of the gravimetric material flow, by the previously described differential-analogue signal, the task set can be easily solved. Heating requirement of a drying equipment being operated in the described way, theoretically varies only in dependence of the change in temperature of the ambient air.

The equipment according to the invention serves for the performance of the process according to the invention, which can be developed by the simple reconstruction of the already existing equipments described in the preamble, mainly gravimetric tower-dryers. Characteristic feature of the equipment consists of the drying area subdivided into sections for preheating and for intensive drying, into a section where material transport, i.e. transport of the bound moisture takes place, and into a cooling section; the sections for preheating and intensive drying are connected to the section for the transport of material, i.e. the bound moisture by a duct, further hygrometers are installed at the inlet for the moist material and in the vicinity of the discharge opening, the differential-analogue signals of the hygrometers are led through the transmitter to the control-unit regulating the intensity of material discharge.

In an advantageous form of construction the unit controlling the intensity of output is provided with a common slide valve which is arranged at the discharge opening, while the signals of the hygrometers are fed, e.g., through a transmitter to the magnetic valves of the working cylinder actuating the mentioned slide valve.

Based on theoretical examinations and on experience it is possible to adjust the proportional relations of the drying sections, thus enabling adjustment to various sorts and a variety of moisture contents of the material to be dried. In particular cases or in case of delicate products it may seem expedient, if the section for preheating and intensive drying and the section for the material transport of the bound moisture are separated by a partition plate, which can be displaced in dependence of the desired proportion between the sections, and the hygrometer inserted at the input of the moist material is connected through a transmitter to the actuating unit of the partition plate. The signals of the hygrometers may be led into the memory of the microprocessor control unit.

In an advantageous form of construction before or after the pressure fan an oil or gas burner of the heating equipment is installed, and controlled by a heat sensing element arranged in the input duct of the pressure fan.

The delivery side of the cooling ventilator of the cooling section is connected expediently into the firing area of the oil or gas burner.

In case, e.g. a heat exchanger is applied as a heating equipment, it is expedient to connect the delivery side of the cooling ventilator of the cooling section to the input duct of the pressure fan for the drying agent.

In certain cases it might be advantagous if the equipment is provided with an exhaustor for the drying agent, and the output duct thereof is connected to an output bonnet or tray adjoinning with the section for preheating and intensive drying.

BRIEF DESCRIPTION OF THE DRAWINGS

The invention will be described in details by means of an advantageous form of construction serving as an example, by the aid of the accompanying drawings, wherein.

EMBODIMENTS

Figure 1:
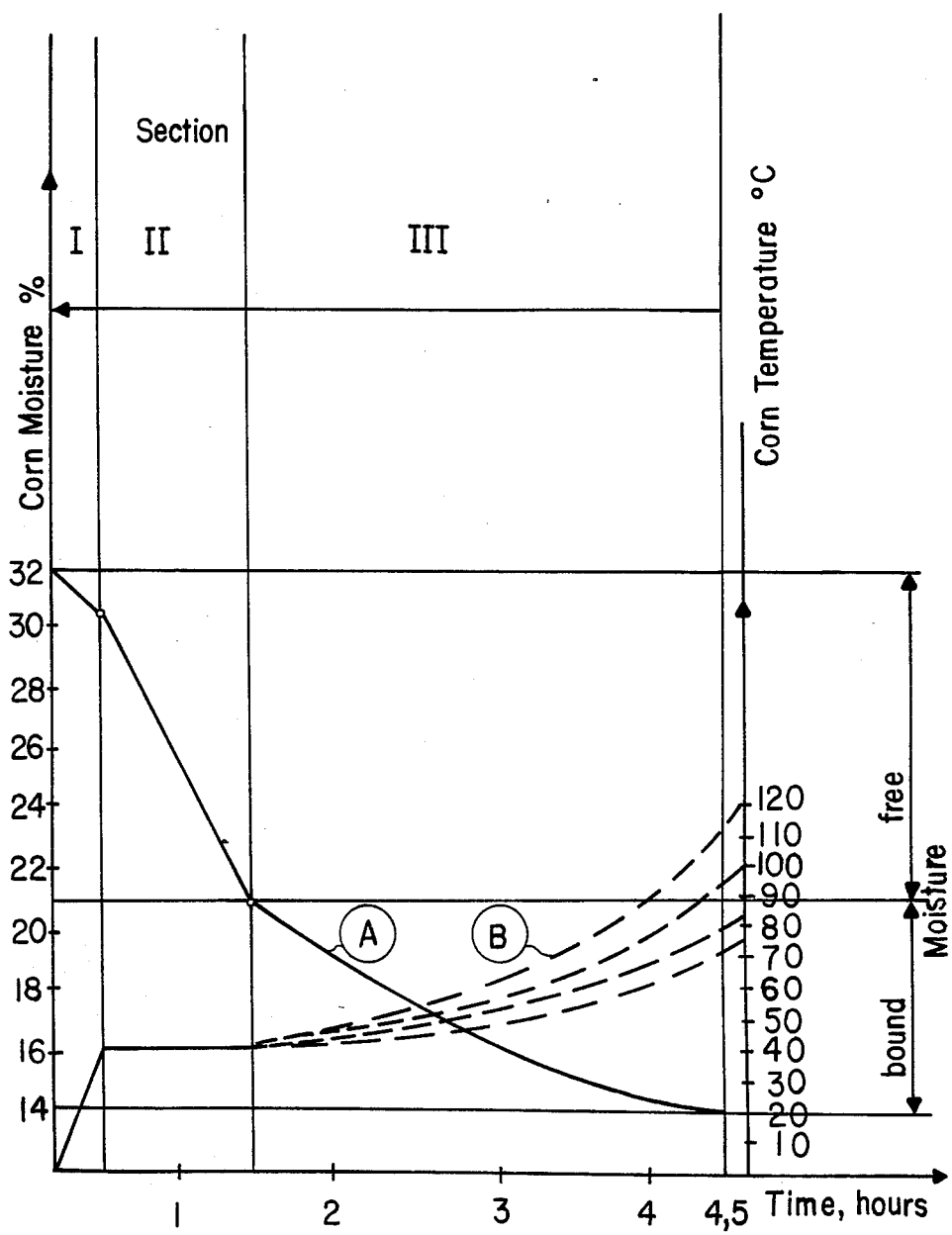
FIG. 1 is showing the drying curve for grains of corn, with the indication of each section in the drying process.

Referring to FIG. 1, it appears clearly that out of the total time need, amounting to about 4.5 hours, approximately $\frac{1}{3}$ hour, i.e. twenty minutes, are required for preheating the grains, /Section I/. The next section serves for the intensive drying with an approximately constant speed, requiring about 1 hour /Section II/, the remaining time, amounting to about 3.2 hours, represents the period needed for the material removal of the bound moisture /Section III/. From the left-side ordinate belonging to curve A it is seen that in sections I and II i.e. in 29% of the total drying time, 68.8% of the moisture is leaving, while in the remaining 71% of the time, only 31.2% of the moisture can be expelled.

On the right-side ordinate of curve B development of the surface temperature of the grains can be seen at a temperature of 120° C. of the drying air. The dashed lines are showing the respective temperature values belonging to the different initial moisture contents.

Figure 2:
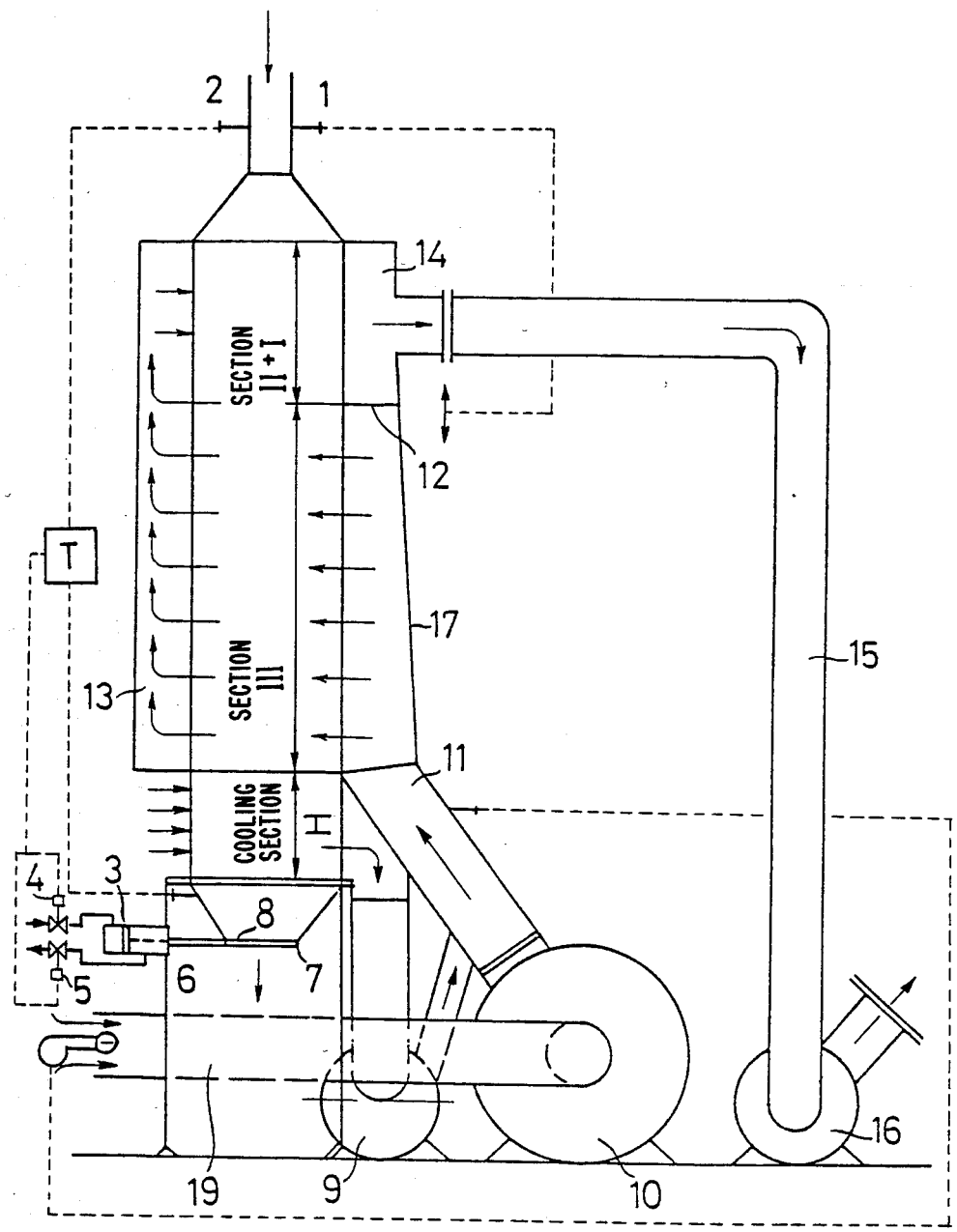
FIG. 2 is the conceptual design of an advantageous form of construction.

FIG. 2 is showing the conceptual design of a tower-dryer for agricultural grains having been constructed in accordance with the invention.

The material to be dried, in our example the corn, is entering through the inlet 1 for the moist material. Moisture content of same is sensed by the hygrometer 2. The value measured is fed into the memory of the controlling microprocessor, where it remains and electronically can be recalled whenever needed in course of the drying process. The grains of corn are continuously passing through sections I and II, where preheating and intensive drying with a constant speed is taking place, as it can be seen in FIG. 1. With the knowledge of the parameter of the material subject to the drying process, modulation depth of the material flow can be determined, e.g. by means of a microprocessor control device, by the aid of mathematical formulae and diagrams obtained empirically for the dryer. Based on the signal of the hygrometer 3 having been arranged at the discharge opening 8, the control characteristics obtained in accordance with the empirical diagrams should be corrected in case of a difference. After having amplified the signal thus obtained in transmitter T, it serves as a pulse to control the magnetic valves 4 and 5, which valves are controlling the input of e.g. the hydraulic oil into the working cylinder 6 to an extent defined by the differential-analogue signal. Consequently, the common slide valve 7 is opening and closing the discharge opening 8 in compliance with the predetermined moisture content of the discharged grains. In this way the material flow in the dryer is automatically set, which ensures optimal operation of the complete equipment.

With a considerably varying moisture content of the material to be dried, the position of the partition plate 12 can be changed, whereby the limits of sections II and III are also modified.

Delivery side of the cooling ventilator 9 of the cooling section H is connected to the input duct 17 of the pressure fan 10. Output of the oil burner 18 is controlled by the heat sensing element 11 arranged in the input duct 17 of the pressure fan 10. Since the extent of heat extraction in the cooling section H is slightly affected by the mass flow of the material to be dried, it is essentially influenced only by the temperature of the ambient air. The temperature of the drying agent entering into section III, which can be waste gas-cooling air or ambient air, is kept by the heat sensing element 11 practically at a constant level. The drying agent is streaming into the system on the surface between the partition plate 12 and the cooling section H. By means of the duct 13 the drying agent leaving section III is recirculated to the sections I and II. From the outgoing bonnet 14 the duct 15 leads the cooled and vapour-laden drying agent to the exhaustor 16, from where it flows into the atmosphere. In case of necessity, a waste catching device and discharging means may be inserted, which are not illustrated. In course of the drying process dust and/or other substances, solid material particles become detached from the material to be dried, collecting and removal thereof can be effected by using already known elements.

The position of the partition plate 12 is changed in dependence of the signal coming from the hygrometer 2. With decreased moisture content, the sections I and II are shortened, with increasing moisture content the sections I and II become longer. The correlation between the moisture content and the length of the sections is depending on the properties of the material to be dried, and are to be determined for each material by measurement, /see FIG. 1/.

Beside the form of construction illustrated the equipment may have different designs. Transport of the material to be dried may be effected, instead of gravitation, by means of a vibratting conveyor, conveyor belt, a scraping conveyor or by any other transporting means. In these cases the differential-analogue signal controls, e.g., the operation of the drive. Heat-energy may be supplied beside the oil burner, e.g., by natural gas, heat-transfer oil, or the waste gas of some agricultural waste, coil- or peat-firing.

EXAMPLE

The process according to the invention will be described by means of a practical example:

The task consists of drying corn grains in a mass flow of 15 t/h with a moisture content of 32% to a reduced/-dried moisture content of 14%. Into section III about 120.000 kg/h drying agent is supplied, out of which about 40.000 kg/h comes from the cooling section. The expelled moisture removed here by the drying agent amounts to about 8 g/kg, that means that together with the moisture quantity of 28.9 g/kg to be removed in sections I and II, the specific vapour expulsion is not amounting to more than 36.9 g/kg, accordingly the parameters of the discharged drying agent are as follows: t=58° C., =27%, and the specific heat consumption equals to 4,031.3 kJ/kg /963.0 kcal/kg/. Besides, the process ensures, whatever circumstances may prevail, i.e. even with changing moisture content of the fed material, a final product with uniform quality.

We claim:
1. A process for drying agricultural and other granular products or produces having a surface and bound moisture content, comprising the steps of:
    (a) introducing said product into a drying area that is subdivided into sections of preheating and intensive drying, a section for the removal of bound moisture from said product, and a cooling section;
    (b) bringing a heated drying agent into contact with said product in the section for the removal of bound moisture from said product;
    (c) directing the drying agent from the section for the removal of bound moisture to the sections for preheating and intensive drying of said product;
    (d) venting the drying agent, laden with vapor from the drying operation, from the drying area for further utilization or into the open air;
    (e) measuring both the moisture content of the product to be dried and fed into the drying area, and that of the product leaving the cooling section of the drying area, and obtaining a differential-analog signal therefrom; and
    (f) controlling the flow rate of the product to be dried and the temperature of the drying agent, individually or simultaneously, in response to said differential-analog signal.
2. The process of claim 1 wherein the drying agent is atmospherical air.
3. Equipment for drying agricultural and granular products and produces having a surface and bound moisture content, through the use of a heat carrying drying agent, comprising:

(a) a drying area provided with an inlet and a discharge opening for the product to be dried, said drying area being subdivided into sections of preheating and intensive drying, a section for the removal of bound moisture from said product, and a cooling section;

(b) a blowing duct having a pressure fan connected thereto for the delivery of the drying agent to the section of the drying area for the removal of bound moisture;

(c) an exhaust duct having an exhaustor connected thereto for the removal of the drying agent;

(d) a connecting duct situated in the drying area for the transfer of the drying agent from the sectin for the removal of bound moisture to the sections for preheating and intensive drying;

(e) means for heating the drying agent, said means being positioned upstream, relative to the flow of the drying agent, of the pressure fan and communicatively engaged with said pressure fan via a heating duct;

(f) a partition plate located between the sections for preheating and intensive drying and the section for the removal of bound moisture, said partition plate being adjustable for altering the physical limits of said sections relative to each other;

(g) at least one hygrometer positioned at both the inlet and discharge opening of drying the area for sensing the moisture content of said product;

(h) transmitter means for sensing a signal received from the hygrometers which sense the moisture content of the product; and (i) control means for controlling the rate of product discharge from the drying area and for adjusting the partition plate in response to a signal received from said transmitter means.

4. The equipment defined by claim 3 wherein the control means for controlling the rate of product discharge from the drying area comprises a slide valve, positioned at the discharge opening of said drying area, communicatively engaged with an operating cylinder having magnetic valves for actuating said slide valve in response to a signal received from the transmitter means.

5. The equipment defined by claim 3 wherein the means for heating the drying agent is positioned downstream, relative to the flow of the drying agent, of the pressure fan.

6. The equipment defined by claim 3 wherein the signal received from said hygrometers are transmitted into the memory of a microprocessor controller.

7. The equipment defined by claim 3 wherein the means for heating the drying agent comprises at least one oil burner connected in controlled relationship with a temperature sensor positioned at the entrance to said blowing duct.

8. The equipment defined by claim 7 wherein the means for heating the drying agent comprises at least one gas burner.

9. The equipment defined by claim 3 additionally comprising a cooling fan communicatively engaged with the cooling section of the drying area, the pressure side of the cooling fan being coupled to said heating duct of said heating means.

10. The equipment defined by claim 9 wherein the pressure side of the cooling fan is coupled to the blowing duct.

11. The equipment defined by claim 3 wherein the exhaust duct for removal of the drying agent is connected to the sections for preheating and intensive drying of the drying area via an output tray.

* * * * *